United States Patent
Morein

(10) Patent No.: US 10,704,709 B2
(45) Date of Patent: Jul. 7, 2020

(54) VARIATIONS OF FLUID OPENING GEOMETRY FOR ROTARY VALVE BODY

(71) Applicant: Schaeffler Technologies AG & Co. KG, Herzogenaurach (DE)

(72) Inventor: Alexander Morein, Dunkirk, NY (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 146 days.

(21) Appl. No.: 15/478,602

(22) Filed: Apr. 4, 2017

(65) Prior Publication Data

US 2018/0283579 A1  Oct. 4, 2018

(51) Int. Cl.
| | | |
|---|---|---|
| *F16K 11/00* | (2006.01) | |
| *F16K 47/04* | (2006.01) | |
| *F16K 11/087* | (2006.01) | |
| *F16K 5/06* | (2006.01) | |
| *F16K 5/12* | (2006.01) | |

(52) U.S. Cl.
CPC .......... *F16K 47/045* (2013.01); *F16K 5/0605* (2013.01); *F16K 5/12* (2013.01); *F16K 11/0873* (2013.01)

(58) Field of Classification Search
CPC ........ F16K 47/04; F16K 47/045; F16K 47/06; F01P 2007/146
See application file for complete search history.

(56) References Cited

U.S. PATENT DOCUMENTS

| | | | |
|---|---|---|---|
| 2,973,181 A | 2/1961 | Johnson | |
| 4,610,273 A * | 9/1986 | Bey | F16K 5/10 137/614.17 |
| 5,332,004 A * | 7/1994 | Gethmann | F16K 5/0605 137/625.32 |
| 5,524,863 A * | 6/1996 | Davis | B08B 9/00 137/625.32 |
| 5,799,695 A * | 9/1998 | Bey | F16K 5/0605 137/625.32 |
| 6,520,209 B1 * | 2/2003 | Lundqvist | F16K 5/0605 137/625.31 |
| 7,011,109 B2 * | 3/2006 | Tran | F16K 5/0605 137/625.32 |
| 7,156,122 B2 * | 1/2007 | Christenson | F16K 5/0605 137/625.32 |
| 7,234,488 B2 * | 6/2007 | Partridge | F16K 5/0605 137/625.32 |
| 7,690,397 B2 * | 4/2010 | Hollis | F16K 11/076 137/625.47 |

(Continued)

FOREIGN PATENT DOCUMENTS

| | | |
|---|---|---|
| WO | 2007136517 A3 | 11/2007 |
| WO | 2016037921 A1 | 3/2016 |

*Primary Examiner* — Reinaldo Sanchez-Medina
(74) *Attorney, Agent, or Firm* — Matthew V. Evans

(57) ABSTRACT

A fluid flow metering rotary valve body is provided that includes a central axis, and at least one lobe having at least one fluid opening. At least one fluid throttle is formed on a perimeter surface of the at least one fluid opening. The fluid throttle can have at least one blind void or at least one protrusion and can facilitate various flow strategies, including a decreasing fluid flow with increasing overlap between the fluid opening and a fluid port. The at least one protrusion can extend to various depths to accommodate different fluid openings and injection molding strategies.

17 Claims, 7 Drawing Sheets

(56) References Cited

U.S. PATENT DOCUMENTS

| | | | |
|---|---|---|---|
| 8,366,070 B2* | 2/2013 | Rimboym | F16K 5/0605 |
| | | | 137/625.31 |
| 9,695,734 B2 | 7/2017 | Carns et al. | |
| 2004/0020541 A1* | 2/2004 | Tran | F16K 5/0605 |
| | | | 137/625.3 |
| 2005/0006150 A1* | 1/2005 | Sims | E21B 21/06 |
| | | | 175/209 |
| 2012/0319025 A1* | 12/2012 | Shu | F16K 47/04 |
| | | | 251/328 |
| 2015/0233477 A1* | 8/2015 | Chen | F16K 47/045 |
| | | | 251/315.01 |

\* cited by examiner

VARIATIONS OF FLUID OPENING GEOMETRY FOR ROTARY VALVE BODY

TECHNICAL FIELD

Example aspects described herein relate to rotary valve bodies for electro-mechanical rotary valves used within fluid cooling systems of vehicular powertrains.

BACKGROUND

As fuel economy becomes paramount in the transportation industry, efforts have increased to achieve higher internal combustion (IC) engine efficiencies and to seek alternative powertrains. Coolant valves are well known and can be arranged to provide coolant flow control for temperature management of various powertrain components including internal combustion engines, transmissions and various components of hybrid electric and fuel cell vehicles.

A portion of coolant valves are electro-mechanical in design, incorporating an actuator assembly that interfaces with a mechanical rotary valve body to provide a controlled flow of coolant to a selected powertrain component or system via one or more fluid flow ports. An electric motor, controlled by the engine control unit, is often employed within the actuator assembly of the electro-mechanical rotary valve (EMRV) to achieve a desired angular position of the rotary valve body. A transmission or gear train can be utilized between the electric motor and rotary valve body. The rotary valve body, in some instances a complex multi-lobed design, is often constructed of plastic and manufactured by an injection molded process. Compared to a rotary valve body machined out of metal, an injection molded rotary valve body provides a light-weight and low fluid resistance solution while optimizing material usage and reducing cost. Multi-lobed rotary valve bodies can consist of a rotary valve assembly, where each of the lobes are individually injection molded and then assembled together in some way. Other multi-lobed designs utilize a single injection molded body that eliminates the assembly step, yet requires complex tooling.

Fluid openings configured within rotary valve bodies meter the amount of fluid flow to or from a rotary valve body, providing variable flow to different segments of a cooling system via one or more fluid ports. The fluid opening can be of many different forms to achieve a desired flow rate. In some rotary body designs, limitations for the form of the fluid opening exist due to constraints provided by injection molding tooling and plastic component design guidelines. These fluid opening limitations can prevent the implementation of features at the beginning or end of the fluid opening to allow for a more gradual increase or decrease of fluid flow with rotation of the rotary valve body. Given the nature of these features, they can be referred to as fluid throttling features. A solution is needed to enable the use of such throttling features while still staying within accepted tooling and design constraints.

Multi-lobed rotary valve bodies typically interface with one or more fluid ports that can deliver fluid to different sectors of a cooling system. In some instances it is desired to gradually increase the rate of fluid flow as a fluid opening is rotated to increase its engagement or overlap with a fluid flow port; however, in other instances, it may be necessary to decrease the fluid flow as the fluid opening and fluid port overlap increases. A solution is needed to enable a decreased fluid flow, optionally reduced down to a zero flow, with increasing fluid opening and fluid port overlap.

SUMMARY

A fluid flow metering rotary valve body is provided that includes a central axis, at least one lobe having at least one fluid opening, and an optional actuator interface. The at least one fluid opening is configured with at least one fluid throttle that includes at least one protrusion formed on a perimeter surface of the at least one fluid opening. A depth of the at least one fluid throttle extends to a bottom surface of the at least one lobe. The at least one protrusion can have at least one distal end. At least one cut-out can be present on a top portion of the at least one fluid throttle to provide at least one additional fluid path. The at least one lobe can have at least one axial wall that is configured with at least one through aperture or at least one radial vane, with the optional actuator interface extending from the at least one radial vane.

In another example embodiment, a fluid flow metering rotary valve body is provided that includes a central axis, and at least one lobe having at least one fluid opening. The at least one fluid opening is configured with at least one fluid throttle that includes at least one protrusion formed on a perimeter surface of the at least one fluid opening. The at least one protrusion forms at least one channel. A depth of the at least one fluid throttle can extend to a bottom surface of the at least one lobe. At least one plug can be disposed within the at least one channel. The at least one channel can be configured with at least one through-aperture to provide at least one additional fluid path. At least a portion of the at least one throttle can define a curved surface. The at least one fluid throttle can comprise of a first fluid throttle and a second fluid throttle. The first fluid throttle can be connected to the second fluid throttle via a curved surface. Additionally, a top surface of the at least one fluid throttle can comprise a plurality of heights.

In another example embodiment, a fluid flow metering rotary valve body is provided that includes a central axis, and at least one lobe having at least one fluid opening. The at least one fluid opening is configured with at least one fluid throttle formed on a perimeter surface of the at least one fluid opening. The fluid throttle comprises at least one void defined by the perimeter surface, the at least one void having a depth less than a depth of the perimeter surface.

In another example embodiment, a fluid flow metering rotary valve body is provided that includes a central axis, and at least one lobe having at least one fluid opening. The at least one fluid opening is configured with at least one fluid throttle formed on a perimeter surface of the at least one fluid opening. The fluid throttle has at least one portion characterized by a decreasing flow with an increasing overlap of the at least one fluid opening and a fluid port. The at least one portion can include a zero flow portion.

BRIEF DESCRIPTION OF DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE EMBODIMENTS

Figure 1A:
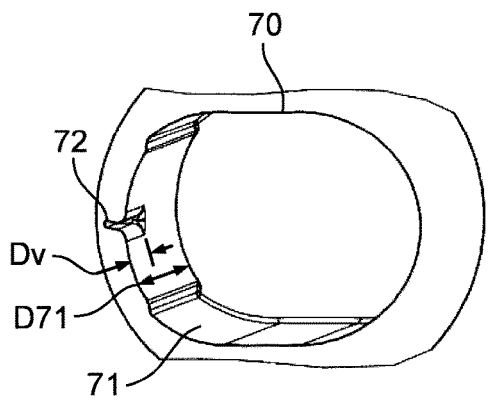
FIGS. 1A through 1H are detailed isometric views of example embodiments of fluid throttles for a fluid opening of a rotary valve body.

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. The words "left", "right", "up", "upward", "down", and "downward" designate directions in the drawings to which reference is made. The terminology includes the words specifically noted above, derivatives thereof, and words of similar import.

Figure 4:
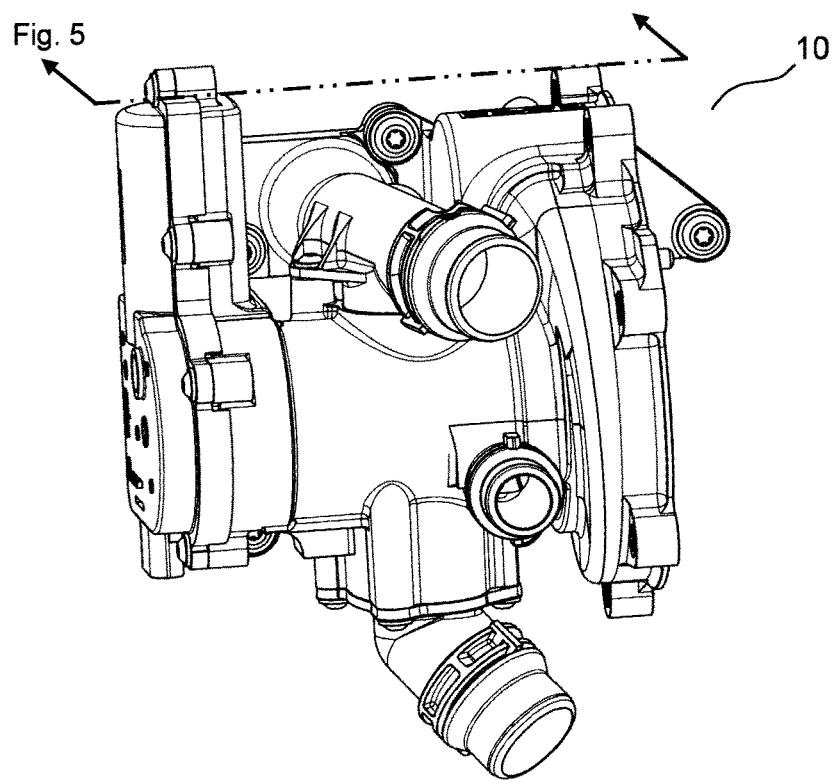
FIG. 4 is a perspective view of a prior art electromechanical rotary valve.
Figure 5:
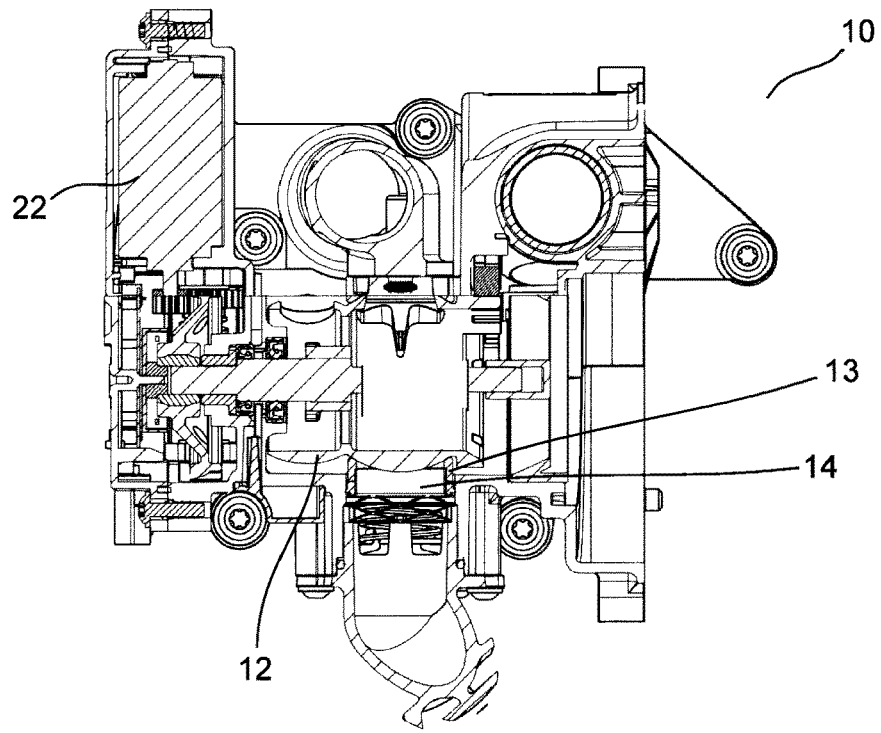
FIG. 5 is a cross-sectional view taken from FIG. 4 showing some key components including a rotary valve body.

FIGS. 4 and 5 show a prior art electro-mechanical rotary valve (EMRV) 10 utilized in cooling systems of internal combustion engines. Components of the EMRV 10 include a rotary valve body 12 that is rotationally displaced by an actuator 22 to control the flow of engine coolant to various portions of a cooling circuit via one or more fluid ports. A fluid port 14 is shown that interfaces with the rotary valve body 12. The fluid port may contain additional features or components, such as a seal assembly 13 that engages the rotary valve body 12.

Figure 6A:
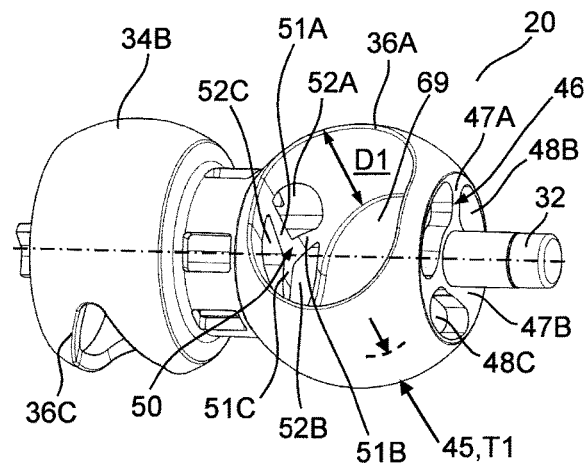
FIGS. 6A and 6B are isometric views of a prior art rotary valve body.
Figure 6B:
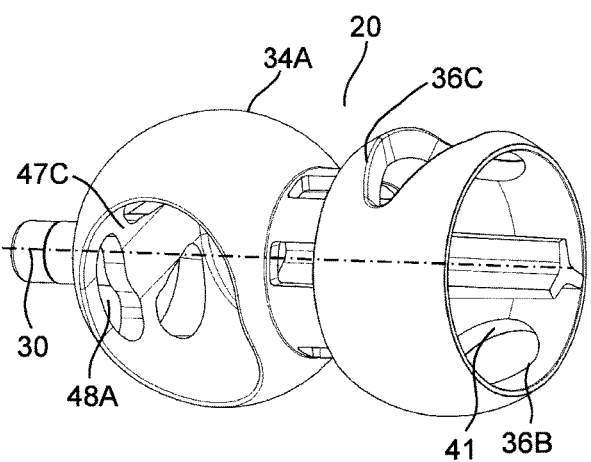
Figure 7:
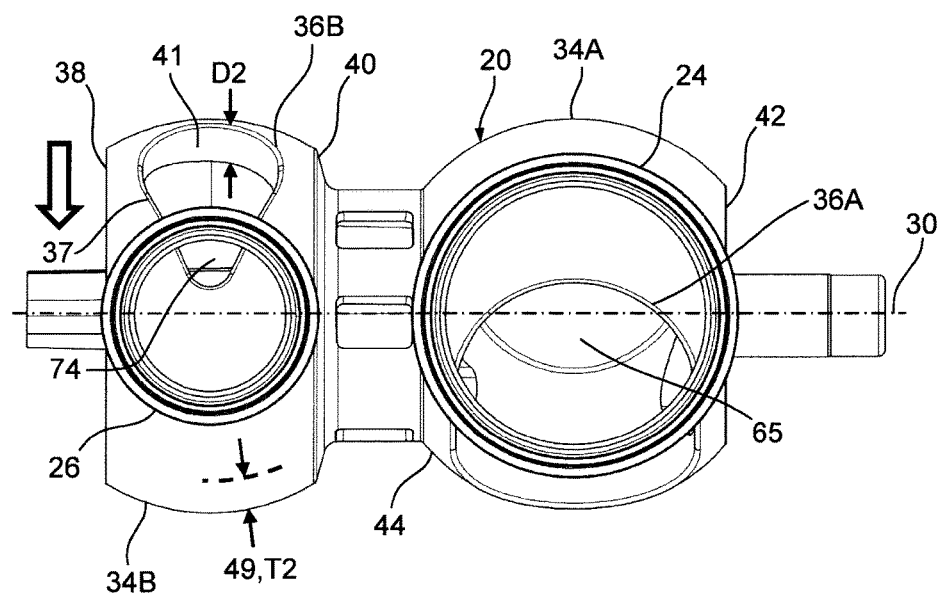
FIG. 7 is a top view of two fluid ports that interface with the rotary valve body of FIGS. 6A-6B in a throttled angular position for each port.

FIGS. 6A-6B and 7 show another prior art rotary valve body 20 that includes a first lobe 34A, a second lobe 34B, a central axis 30, and an optional actuator interface 32. The actuator interface 32 is optional since some rotary valve body designs can be attached in series within a larger valve body assembly, and, thus, do not require an actuator interface. The first lobe 34A has a first fluid opening 36A while the second lobe 34B has a second fluid opening 36B and a third fluid opening 36C. The first lobe 34A has a closed first end 42 due to a first axial wall 46 and a closed second end 44 due to a second axial wall 50 that is present between the first and second lobes 34A, 34B. The first axial wall 46 is configured with a first 47A, a second 47B, and a third radial vane 47C; and a first 48A, a second 48B, and a third through-aperture 48C. The second axial wall 50 is configured with a fourth 51A, a fifth 51B, and a sixth radial vane 51C and a fourth 52A, a fifth 52B, and a sixth 52C through-aperture. The optional actuator interface 32 can extend from one or more of the radial vanes 47A-C, 51A-C. The second lobe 34B has an open first end 38 and a closed second end 40 due to the second axial wall 50. One familiar with the art of EMRVs and associated rotary valve bodies would understand that different forms and arrangements of axial walls, radial vanes, and through-apertures would be possible.

Referring now to FIG. 7, a port view is shown of the rotary valve body 20 together with a first fluid port 24 and a second fluid port 26 in a first rotational position. The first and second fluid ports 24, 26 are orthogonal to the central axis 30. While both ports 24, 26 are shown parallel to each other, they can reside at any angular position (while typically remaining orthogonal to the central axis 30) with respect to the rotary valve body 20. The fluid ports 24, 26 can direct either incoming or outgoing fluid to and from the rotary valve body 20, respectively. In the first rotational position, the first port 24 directs fluid flow to or from the first fluid opening 36A of the first lobe 34A and the second port 26 directs fluid flow to or from the second fluid opening 36B of the second lobe 34B. The first fluid opening 36A can be characterized as stadium-shaped while the second fluid opening 36B is formed with a triangular-shaped end 37. In the first rotational position, the first fluid port 24 only engages a portion of the first fluid opening 36A, resulting in a first overlap 65; while the second fluid port 26 engages a tip of the triangular-shaped end 37 of the second fluid opening 36B, resulting in a second overlap 74. As the rotary valve body 20 rotates downward, a decrease in fluid flow occurs in the first fluid port 24 because of a lower first overlap 65 between the first fluid opening 36A and the first fluid port 24. An increase in fluid flow occurs in the second fluid port 26 due to an increase in the second overlap 74 between the second fluid opening 36B and the second fluid port 26; however, it should be noted that due to the triangular-shaped end 37, the rate of fluid flow increase is less than if the second fluid opening 36B was stadium-shaped, like that of the first fluid opening 36A.

Figure 9:
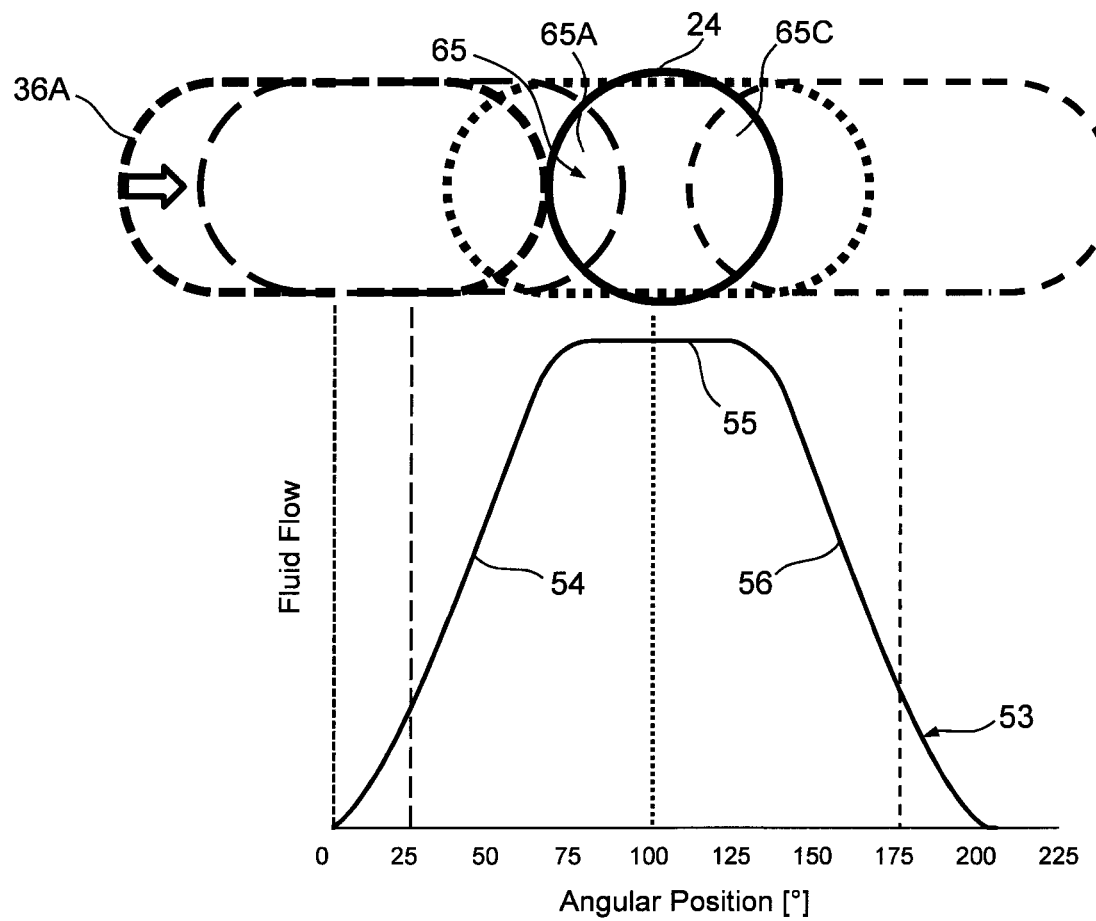
FIG. 9 shows a fluid flow plot for a prior art stadium-shaped fluid opening.
Figure 10:
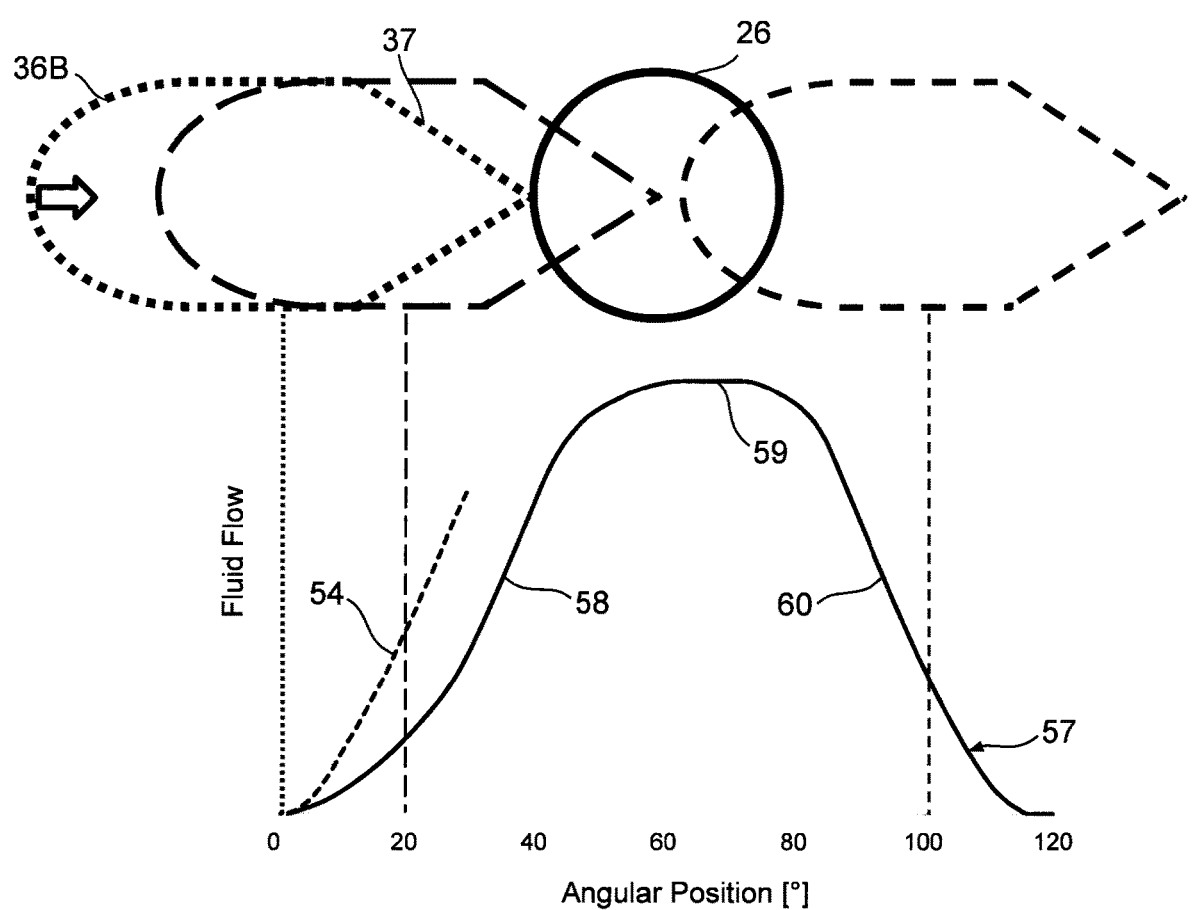
FIG. 10 shows a fluid flow plot for a prior art triangular-shaped fluid throttle arranged at an end of a stadium-shaped opening.

FIGS. 9 and 10 show qualitative fluid flow plots for a stadium-shaped fluid opening, representative of the first fluid opening 36A, and a triangular-shaped-end fluid opening, representative of the second fluid opening 36B, respectively. Within these plots various overlap conditions between the fluid ports 24, 26 and the first and second fluid openings 36A, 36B are shown along with a corresponding fluid flow.

Referring to FIG. 9, a plot of fluid flow versus angular position is shown for the first fluid opening 36A in the form of a stadium flow curve 53. Along this curve 53, four different rotational or angular positions of the first fluid opening 36A are highlighted. Broken lines of differing segment lengths are drawn to differentiate the four angular positions of the first fluid opening 36A as it moves left-to-right with respect to the first port 24. A corresponding vertical line is drawn from a center of the first fluid opening 36A at each position to clarify the angular position. The first angular position shown at 0 degrees depicts a zero-flow condition since there is no overlap between any portion of the first fluid opening 36A and the first port 24. The second angular position shown at 25 degrees depicts a partial-flow condition where the first fluid opening 36A overlaps partially with the first fluid port 24, yielding a small opening overlap 65A that results in fluid flow. The third angular position shown at 100 degrees depicts a full-flow condition as the first fluid opening 36A fully overlaps the first port 24. The fourth angular position shown at 175 degrees depicts a partial-flow condition where the first fluid opening 36A overlaps partially with the first fluid port 24, yielding a small closing overlap 65C that results in fluid flow.

With view to the stadium flow curve 53, three distinct segments are visible. A first stadium flow curve segment 54 represents an increasing overlap between the first fluid opening 36A and the first fluid port 24, resulting in a non-linear flow increase; a second stadium flow curve segment 55 represents a maximum and constant overlap between the first fluid opening 36A and the first fluid port 24, resulting in a maximum and constant fluid flow; and, a third stadium flow curve segment 56 represents a decreasing overlap between the first fluid opening 36A and the first fluid port 24, resulting in a non-linear flow decrease. The slope or steepness of the first and third stadium curve segments 54, 56 are representative of the rate of flow increase or decrease, respectively; such a gradual increase or decrease is often desired in EMRV applications.

Now referring to FIG. 10, a plot of fluid flow versus angular position is shown for the second fluid opening 36B in the form of a triangular throttle flow curve 57. Along this curve 57, three different rotational or angular positions of the second fluid opening 36B are highlighted. Broken lines of differing segment lengths are drawn to differentiate the three angular positions of the second fluid opening 36B as it moves left-to-right with respect to the second port 26. A corresponding vertical line is drawn from a center of the second fluid opening 36B at each position to clarify the angular position.

As with the stadium flow curve 53 of FIG. 9, three distinct segments of the triangular throttle flow curve 57 are present. A first triangular throttle flow curve segment 58 represents an increasing overlap between the second fluid opening 36B and the second fluid port 26, resulting in a non-linear flow increase; a second triangular throttle flow curve segment 59 represents a maximum and constant overlap between the second fluid opening 36B and the second fluid port 26, resulting in a maximum and constant fluid flow; and, a third triangle throttle flow curve segment 60 represents a decreasing overlap between the second fluid opening 36B and the second fluid port 26, resulting in a non-linear flow decrease. It should be noted that the first triangular throttle flow curve segment 58 is different in shape than the first stadium flow curve segment 54 of FIG. 9, also superimposed on FIG. 10. The difference in shape can be attributed to a throttling effect provided by the triangular portion 37 of the second fluid opening 36B. The throttling effect facilitates a lower rate of fluid flow increase within the first segment 58 as overlap between the second fluid opening 36B and the second port 26 increases to a maximum flow condition achieved in the second segment 59.

Figure 8:
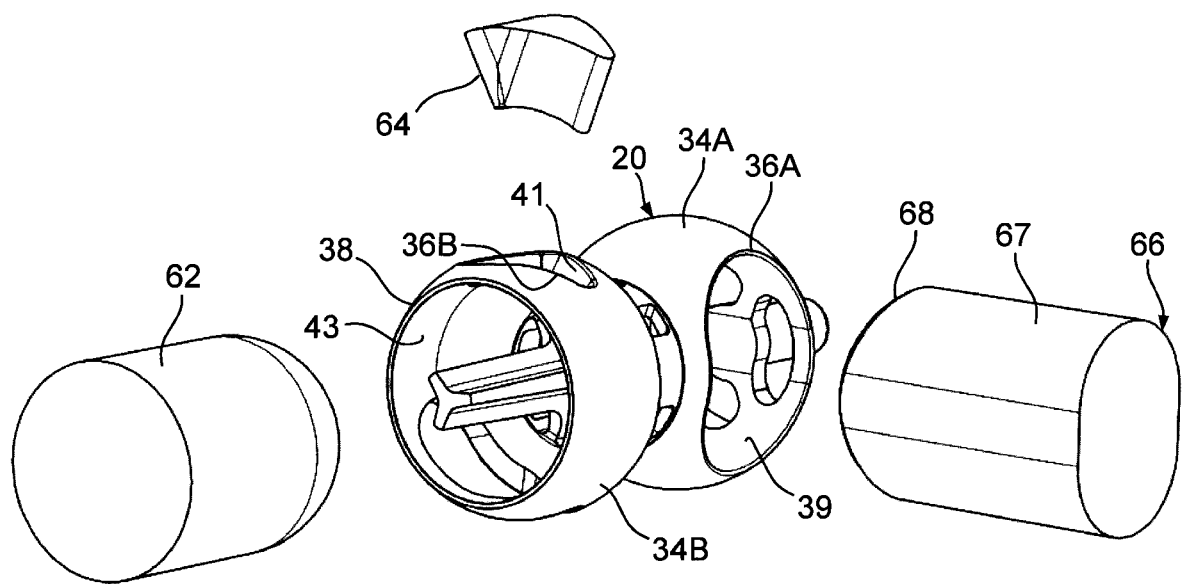
FIG. 8 is an isometric view of the rotary valve body of FIGS. 6A-6B with a generic representation of injection molding tooling.

A partial representation of a prior art injection mold tooling arrangement is shown in FIG. 8 that includes tool slides 62, 64, 66 that facilitate formation of the first and second fluid openings 36A, 36B configured within the rotary valve body 20. The following discussion references features within FIGS. 6A, 6B and 7 with view to FIG. 8.

For the second fluid opening 36B, a two-slide tooling arrangement is possible due to the open first end 38 of the second lobe 34B. A first slide 62 is inserted axially within a larger outer tool (not shown) to form a hollowed-out space having a second inner surface 43. The second inner surface 43 forms an interior surface of a second circumferential wall 49. A second slide 64 is then inserted radially within the outer tool (not shown), abutting with the first slide 62, to form the second fluid opening 36B, having a second perimeter surface 41 with a depth D2.

The first fluid opening 36A of the first lobe 34A is formed differently than the second fluid opening 36B. Due to the first and second axial walls 46, 50 on the first and second ends 42, 44 of the first lobe 34A, an axial slide is not possible to form a hollowed out space. Therefore, a lone third slide 66 forms the first fluid opening 36A that extends through the width of the first lobe 34A. The first fluid opening 36A has an extended first perimeter surface 39 with a depth D1. The third slide 66, together with an outer tool form (not shown) establish a first circumferential wall 45 with a thickness T1, that typically adheres to injection molding and associated plastic material design guidelines. A lateral surface 67 of the third slide 66 forms the first perimeter surface 39 and an end surface 68 forms a bottom surface 69 of the first lobe 34A.

As shown in FIG. 7, the second fluid opening 36B is formed within the second circumferential wall 49 having a thickness T2 created by the first slide 62. To achieve uniform cooling during the valve body molding process, and thus uniform crystallization and stress relaxation, the variation in T2 (or any wall thickness within the rotary valve body 20) must be minimized. In excessively thick part sections, the surface stops shrinking as it cools and solidifies, while the interior bulk continues cooling and shrinking. The difference in shrinking can pull the material apart leaving sink marks and shrink voids which reduce overall strength with potentially compromised dimensional accuracy and, thus, compromised EMRV function.

Now referring to FIG. 6A, the first fluid opening 36A is formed within the first lobe 34A such that the size of the first fluid opening 36A dictates a thickness T1 of the first circumferential wall 45. Given the aforementioned desired uniformity and magnitude of wall thickness, any reduction in size of the first fluid opening 36A could adversely increase the thickness T1 of the first circumferential wall 45. If a triangular-shaped end was incorporated to serve as a throttle and reduce a fluid flow rate increase such as in the second fluid opening 36B, an increase in resulting wall thickness would likely lead to the previously stated issues.

FIGS. 1A through 1H show multiple example embodiments of fluid openings configured with several forms of fluid throttles. Each of these fluid throttles can be formed on a perimeter surface of a fluid opening and offer solutions for: 1). Maintaining optimum wall thicknesses of a rotary valve body, and 2). Facilitating a reduced fluid flow with increasing overlap between a fluid opening and a fluid port.

FIG. 1A shows a fluid opening 70 configured with an example embodiment of a fluid throttle in the form of a void 72 defined by a perimeter surface 71 of the fluid opening 70. The void 72 can be applied to a perimeter surface of any fluid opening, including, but not limited to the first, second, and third fluid openings 36A-36C of the previously described rotary valve body 20. A depth Dv of the void 72 can be less than a depth D71 of the perimeter surface 71 of the fluid opening 70. For example, if the void 72 is applied to a fluid opening similar to the first fluid opening 36A, the depth Dv of the void could be less than a depth D1 of the first perimeter surface 39. In another example, if the void 72 is applied to a fluid opening similar to the second fluid opening 36B, the depth Dv of the void 72 could be less than the depth D2 of the second perimeter surface 41. The shape of the void 72 can be any form that facilitates a fluid throttling effect as overlap between the fluid opening 70 and a fluid port increases.

Figure 1B:
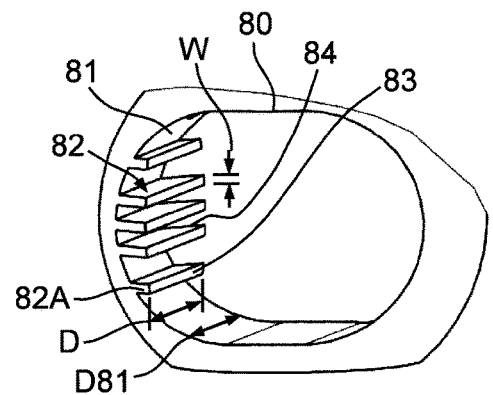

FIG. 1B shows a fluid opening 80 configured with an example embodiment of a fluid throttle comprising a plurality of protrusions 82 formed on a perimeter surface 81 of the fluid opening 80. While a plurality of protrusions 82 is shown, a single protrusion 82A would also be possible. The protrusions 82 can have a distal end 83, as shown, however the shape of protrusions 82 can be of any form that facilitates a fluid throttling effect as overlap between the fluid opening 80 and a fluid port increases. The protrusions 82 can be applied to a perimeter surface of any fluid opening, including, but not limited to the first, second, and third fluid openings 36A-36C of the previously described rotary valve body 20. For example, a bottom wall 84 of at least one of the protrusions 82 can extend to either: 1). The bottom surface 69 of the first fluid opening 36A, or 2). The second inner surface 43 of the second circumferential wall 49 of the second fluid opening 36B. A width W of the protrusions 82 can be less than a depth D of the protrusions 82.

Figure 1C:
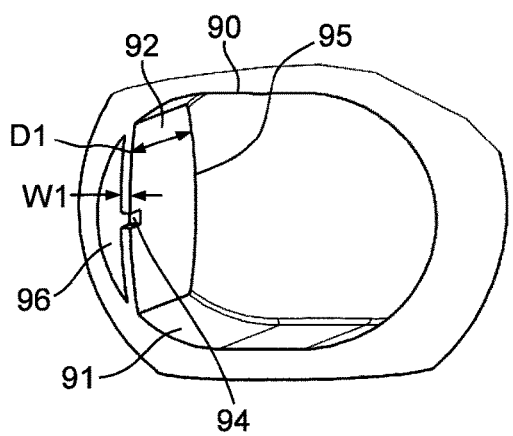
Figure 1D:
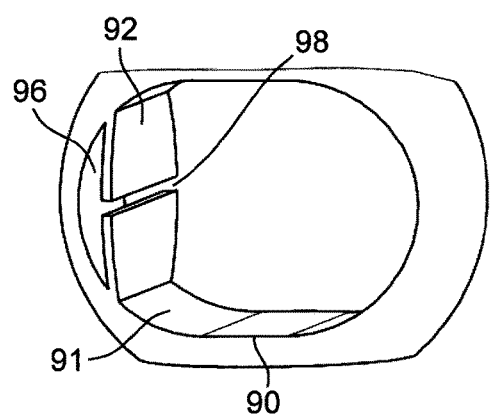

FIGS. 1C and 1D show the fluid opening 90 configured with additional example embodiments of a fluid throttle comprising a protrusion 92 that forms a channel 96. As with the example embodiment of FIG. 1B, the protrusion 92 can be applied to a perimeter surface of any fluid opening, including, but not limited to the first, second, and third fluid openings 36A-36C of the previously described rotary valve body 20. A bottom wall 95 of the protrusion 92 can extend to either: 1). The bottom surface 69 of the first fluid opening 36A, or 2). The second inner surface 43 of the second circumferential wall 49 of the second fluid opening 36B. In FIG. 1C, a top portion of the protrusion 92 defines a cut-out 94. More than one cut-out 94 could be possible and many different forms of the cut-out 94 are possible. A width W1 of the protrusion 92 can be less than a depth D1 of the protrusion 92. In FIG. 1D, the channel 96 is configured with a through-aperture 98, but could be of a different form than what is shown.

Figure 1E:
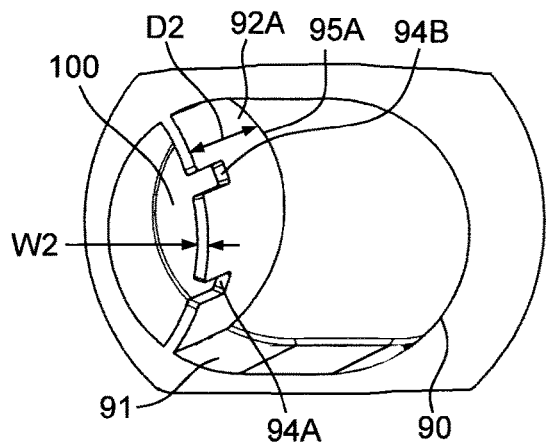
Figure 2A:
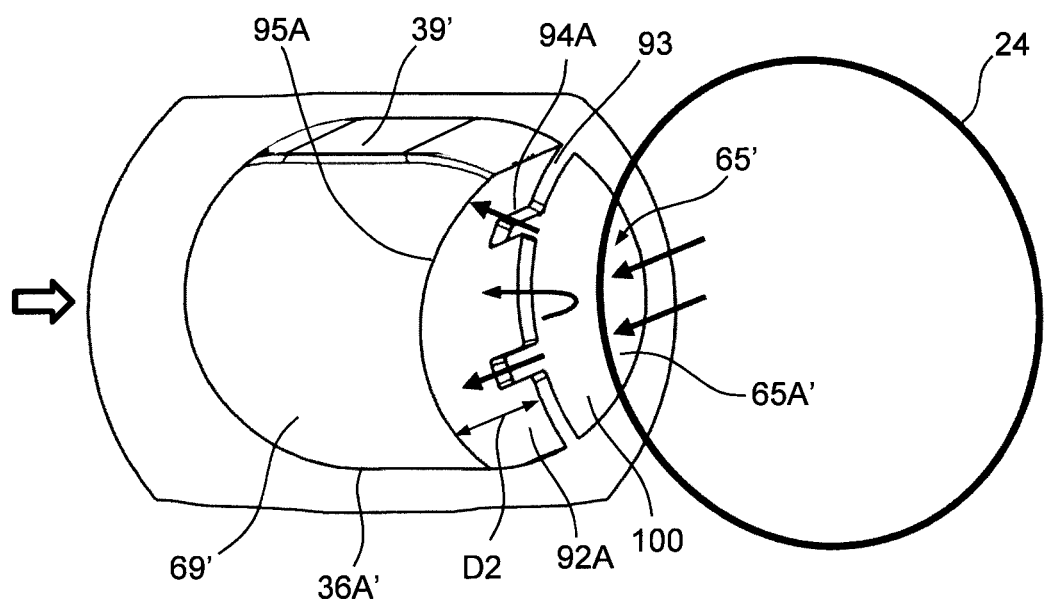
FIGS. 2A and 2B schematically show two different angular positions for the fluid throttle example embodiment shown in FIG. 1E.
Figure 2B:
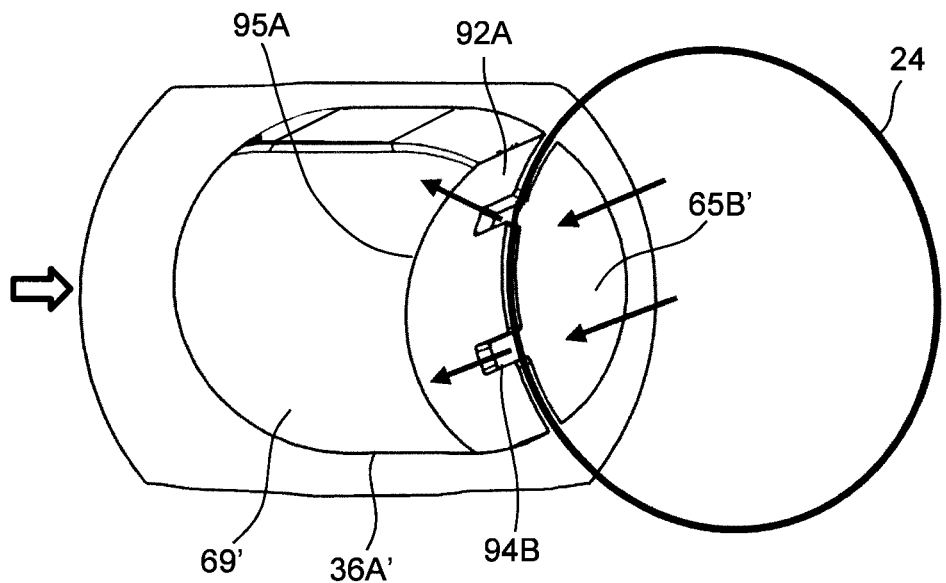

FIG. 1E shows the fluid opening 90 with yet another example embodiment of a fluid throttle comprising a curved protrusion 92A that forms a channel 100. A top portion of the curved protrusion 92A defines two cutouts 94A, 94B. A width W2 of the curved protrusion 92A can be less than a depth D2 of the curved protrusion 92A. As with the previous example embodiment, a bottom wall 95A of at least one of the protrusions 92A can extend to either: 1). The bottom surface 69 of the first fluid opening 36A, or 2). The second inner surface 43 of the second circumferential wall 49 of the second fluid opening 36B. FIGS. 2A and 2B depict the aforementioned case 1 with the curved protrusion 92A extending to a bottom surface 69' of a throttled first fluid opening 36A'. A schematic representation of the first fluid port 24 is shown in each figure along with its overlap 65' with the throttled first fluid opening 36A'. A first throttled angular position is shown in FIG. 2A, while a second throttled angular position is shown in FIG. 2B. While the first fluid port 24 can direct fluid to or from the throttled first fluid opening 36A', FIGS. 2A and 2B both assume that the first fluid port 24 directs incoming fluid flow to the throttled first fluid opening 36A'. Referring to FIG. 2A the first throttled angular position facilitates a downward flow of fluid from the first fluid port 24 to the channel 100 through an overlap 65A' of the first fluid port 24 and the throttled first fluid opening 36A'. As indicated by flow arrows, since the bottom wall 95A of the curved protrusion 92A extends to the bottom surface 69' of the throttled first fluid opening 36A', an exiting fluid path only exists between the first fluid port 24 and the curved protrusion 92A. Therefore, fluid only has an exiting flow path through the first and second cut-outs 94A, 94B and over a top surface 93 of the curved protrusion 92A. As the throttled first fluid opening 36A is rotated further, the overlap 65' between the first fluid port 24 and throttle first fluid opening 36A' increases while the resultant or exiting flow path from the cavity 100 becomes more restricted until the second throttled angular position is achieved, as shown in FIG. 2B. At the second throttled angular position, an overlap 65B' of the first fluid port 24 and the throttled first fluid opening 36A' exists while the first fluid port 24 is sealed against the top surface 93 of the curved protrusion 92A; therefore, all incoming fluid flow is exited through the first and second cut-outs 94A, 94B, maintaining a relatively constant fluid flow until the curved protrusion 92A becomes disengaged from the first fluid port 24, facilitating an increased flow. The first fluid port 24 may contain a seal assembly that engages with the curved protrusion 92A.

Figure 3:
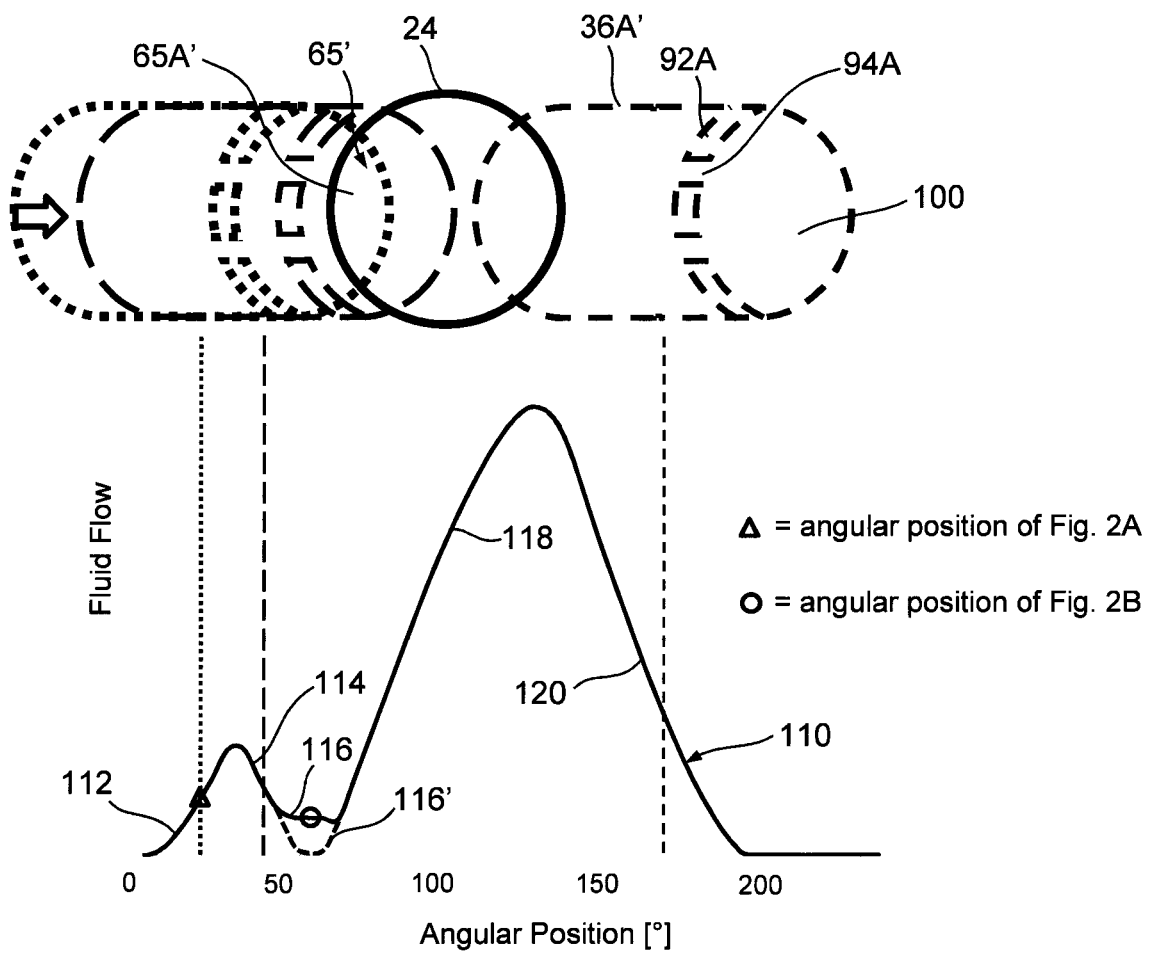
FIG. 3 shows a flow diagram for the fluid opening shown in FIG. 1E.

Now referring to FIG. 3, a plot of fluid flow versus angular position is shown for the throttled first fluid opening 36A' relative to the first fluid port 24 in the form of a throttled cavity flow curve 110. The angular positions shown in FIGS. 2A and 2B are captured within the plot, as shown. Broken lines of differing segment lengths are drawn to differentiate three angular positions of the throttled first fluid opening 36A' as it moves left-to-right with respect to the first port 24. A corresponding vertical line is drawn from a center of the throttled first fluid opening 36A' at each position to clarify the angular position.

Five distinct segments of the throttled cavity flow curve 110 are present. A throttled first increase segment 112 corresponds to an increasing overlap 65' of the throttled first fluid opening 36A' and the first fluid port 24; within this segment 112 is the angular position shown in FIG. 2A. As the throttled first fluid opening 36A' is rotated further, the overlap 65' between the first fluid port 24 and throttle first fluid opening 36A' increases while the resultant or exiting flow path from the cavity 100 becomes more restricted; this condition corresponds to a first throttled decrease segment 114 of the throttled cavity flow curve 110. The first throttled decrease segment 114 could also be characterized as decreasing flow with an increasing overlap 65' of the first fluid port 24 and the throttled first fluid opening 36A'. Such a decreasing flow with increasing overlap characteristic may be beneficial when it corresponds with a specific angular orientation or flow condition of another fluid opening with respect to an adjacent fluid port.

Following the first throttled decrease segment 114 is a throttled constant segment 116. The second throttled angular position of FIG. 2B resides within this segment and results when the curved protrusion 94A seals against the first fluid port 24, resulting in an exiting flow path through the cut-outs 94A, 94B that remains constant. The length of the throttled constant segment is a function of sealing duration that occurs between the top surface 93 of the curved protrusion 94A and the first fluid port 24. Curved portions at each end of this segment could be present due to slight leakage that occurs as sealing engagement length between the top surface 93 and first fluid port 24 is reduced. The amount of flow permitted within the throttled constant segment 116 could be adjusted to different flow rates by changing the geometry and number of cut-outs 94A, 94B. Furthermore, a zero-flow condition could be achieved in the absence of cut-outs 94A, 94B. This condition is represented by a throttled zero segment 116' represented by a broken line below the throttled constant segment 116. Once again, the zero-flow condition would be possible even though the overlap 102 between the throttled first fluid opening 36A' and the first fluid port is increasing.

Following the throttled constant 116 or throttled zero 116' segments, is a second throttled increase segment 118. This segment results when the curved protrusion 92A is no longer sealed against the fluid port 24A as the throttled first fluid opening 36A' continues its rotation, facilitating an increase in overlap 65'.

A second throttled decrease segment 120 is achieved when a decreasing overlap 65' occurs between the throttled first fluid opening 36A' and the first fluid port 24.

Those that are familiar in the art of fluid rotary valves are aware that the shape of the five previously described segments could vary. Additionally, the flow curve captured in FIG. 3, along with those in FIGS. 9 and 10, are mere generic representations of flow versus angular position for a given fluid opening. Therefore, the height and duration of each of the segments could be different than what is shown.

Figure 1F:
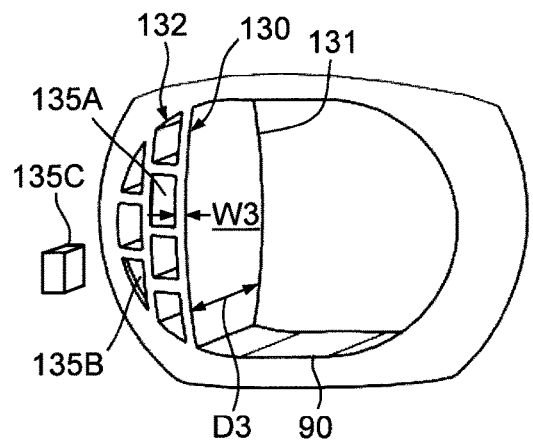

Now referring to FIG. 1F, the fluid opening 90 is shown with another example embodiment of a fluid throttle comprising a plurality of protrusions 130 that form a plurality of channels 132. A width W3 of the protrusions 130 can be less than a depth D3 of the protrusions 130. As with the previous example embodiments, the protrusions 130 can be applied to a perimeter surface of any fluid opening, including, but not limited to the first, second, and third fluid openings 36A-36C of the previously described rotary valve body 20. A bottom wall 131 of at least one of the protrusions 130 can extend to either: 1). The bottom surface 69 of the first fluid opening 36A, or 2). The second inner surface 43 of the second circumferential wall 49 of the second fluid opening 36B. For case 1, a portion of the resulting flow curve could be characterized as having a decreasing flow with increasing overlap, similar to the resulting flow curve of the curved protrusion 92A described in FIG. 1E. If one or more of the plurality of protrusions 130 are curved, similar to the curved protrusion 92A of FIG. 1E's example embodiment, then a zero-flow condition could also result. Furthermore, arranging the channels 132 in a row configuration, such as shown in FIG. 1F, could result in multiple portions within the representative flow curve characterized by a throttled flow increase segment followed by a decreasing flow with increasing overlap segment; additionally, it could be possible to have one or more throttled-zero segments in place of the decreasing flow with increasing overlap segments. One or more channel plugs 135A-135C may be inserted in the channels 132 to achieve different throttle effects. The channel plugs 135A-135C can be installed at different insertion depths, as shown, and can be secured within the channels 132 in different ways including press-fit, use of adhesive, ultrasonic welding, or any other joining process. The material for the channel plugs can be any suitable material, including, but not limited to, the material of the valve body 20.

Figure 1G:
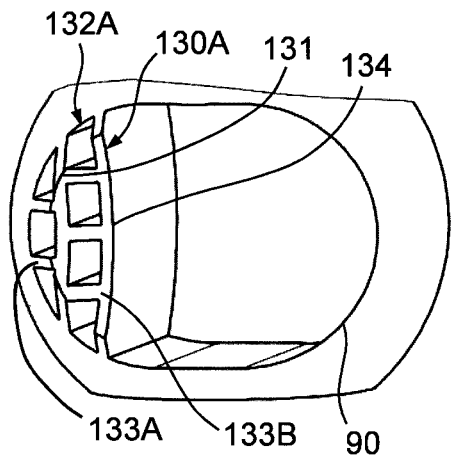

Referring to FIG. 1G, the fluid opening 90 is shown with an example embodiment of a fluid throttle comprising a plurality of protrusions 130A that form a first 133A and a second 133B throttle. One or more channels 132A can be arranged within each of the two throttles 133A, 133B. The first fluid throttle is connected to the second fluid throttle by a curved surface 131, while the second throttle 133B defines a curved surface 134. With this throttle configuration, a top surface of the throttle comprises a plurality of heights.

Figure 1H:
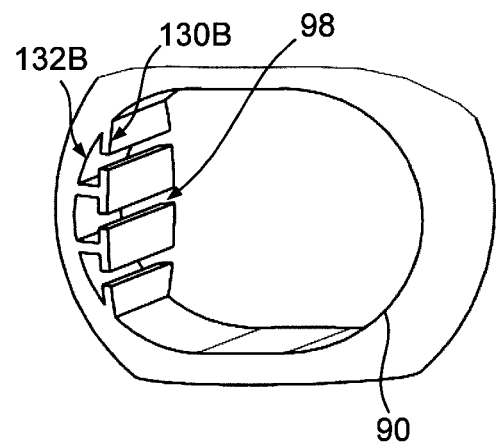

Referring to FIG. 1H, the fluid opening 90 is shown with an example embodiment of a fluid throttle comprising a plurality of protrusions 130B that form a plurality of channels 132B. Similar to the example embodiment of FIG. 1D, the channels 132B are configured with through-apertures 98 that serve as a fluid exit. The form of the through-apertures 98 and channels may be different than what is shown.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

What we claim is:

1. A fluid flow metering rotary valve body comprising:
a central axis;
at least one lobe having at least one fluid opening, the at least one fluid opening including:
a perimeter surface;
at least one fluid throttle formed on the perimeter surface, the at least one fluid throttle comprising at least one protrusion having a width less than a width of the at least one fluid opening; and,
a bottom surface; and,
a depth of the at least one fluid throttle extending to the bottom surface.

2. The fluid flow metering rotary valve body of claim 1, wherein the at least one lobe has at least one axial wall.

3. The fluid flow metering rotary valve body of claim 2, wherein the at least one axial wall is configured with at least one through-aperture.

4. The fluid flow metering rotary valve body of claim 2, wherein the at least one axial wall is configured with at least one radial vane.

5. The fluid flow metering rotary valve body of claim 1, further comprising an actuator interface.

6. The fluid flow metering rotary valve body of claim 1, wherein the at least one protrusion has at least one distal end.

7. The fluid flow metering rotary valve body of claim 1, wherein a top portion of the at least one protrusion defines at least one cut-out.

8. A fluid flow metering rotary valve body comprising:
a central axis;
at least one lobe having at least one fluid opening, the at least one fluid opening including:
a perimeter surface;
at least one fluid throttle formed on the perimeter surface, the at least one fluid throttle comprising at least one protrusion, and, the at least one protrusion forming at least one channel; and,
the at least one fluid opening is configured to provide:
(i) an incoming fluid path defined by a first portion of the at least one fluid throttle that overlaps a fluid port; and, (ii) an exiting fluid path through a second portion of the at least one fluid throttle that does not overlap the fluid port.

9. The fluid flow metering rotary valve body of claim 8, wherein at least a portion of the at least one fluid throttle defines a curved surface.

10. The fluid flow metering rotary valve body of claim 9, wherein the curved surface is configured to seal with a fluid port.

11. The fluid flow metering rotary valve body of claim 8, wherein at least one plug is disposed within the at least one channel.

12. The fluid flow metering rotary valve body of claim 8, wherein the at least one channel is configured with at least one through-aperture.

13. The fluid flow metering rotary valve body of claim 8, wherein the at least one fluid throttle comprises a first fluid throttle and a second fluid throttle, the first fluid throttle connected to the second fluid throttle by a curved surface.

14. The fluid flow metering rotary valve body of claim 8, wherein a top surface of the at least one fluid throttle comprises a plurality of heights.

15. The fluid flow metering rotary valve body of claim 8, wherein a top portion of the at least one protrusion defines at least one cut-out.

16. A fluid flow metering rotary valve body comprising:

a central axis;

at least one lobe having at least one fluid opening, the at least one fluid opening including:

a perimeter surface;

at least one fluid throttle formed on the perimeter surface; and, the at least one fluid opening configured to provide: (i) an incoming fluid path; and, (ii) an exiting fluid path configured to decrease with an increasing overlap of the at least one fluid opening and a fluid port.

17. The fluid flow metering rotary valve body of claim 16, wherein the at least one fluid throttle is configured to provide a zero-flow condition when the at least one fluid opening overlaps the fluid port.

* * * * *